United States Patent
Ommer et al.

(10) Patent No.: US 9,670,973 B2
(45) Date of Patent: Jun. 6, 2017

(54) METHOD TO CONTROL THE TORQUE TRANSFER RATE OF A CLUTCH, CLUTCH CONTROL UNIT FOR A CLUTCH AND TRANSMISSION WITH SUCH A CONTROL UNIT

(71) Applicant: ZF Friedrichshafen AG, Friedrichshafen (DE)

(72) Inventors: Christoph Ommer, Friedrichshafen (DE); Christian Soeldner, Friedrichshafen (DE); Ricardo Gonzalez-Ramos, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 209 days.

(21) Appl. No.: 14/496,393

(22) Filed: Sep. 25, 2014

(65) Prior Publication Data
US 2015/0094923 A1    Apr. 2, 2015

(30) Foreign Application Priority Data
Sep. 25, 2013   (DE) .................. 10 2013 219 327

(51) Int. Cl.
*B60W 10/02* (2006.01)
*B60W 10/11* (2012.01)
*F16D 48/06* (2006.01)

(52) U.S. Cl.
CPC .... *F16D 48/06* (2013.01); *F16D 2500/30406* (2013.01); *F16D 2500/30803* (2013.01);
(Continued)

(58) Field of Classification Search
None
See application file for complete search history.

(56) References Cited

U.S. PATENT DOCUMENTS

| 6,468,182 | B1* | 10/2002 | Brandt | B60W 10/02 477/107 |
| 2004/0185985 | A1* | 9/2004 | Inoue | F16H 61/0437 477/70 |

(Continued)

FOREIGN PATENT DOCUMENTS

| DE | 199 45 473 A1 | 4/2000 |
| DE | 101 01 597 A1 | 8/2001 |

(Continued)

OTHER PUBLICATIONS

Office Action from corresponding DE 10 2013 219 327.0 issued Mar. 20, 2014.

*Primary Examiner* — Edwin A Young
(74) *Attorney, Agent, or Firm* — Brinks Gilson & Lione

(57) ABSTRACT

The disclosure relates to a procedure for controlling torque transmission rate of a clutch. The clutch is in connection with a transmission and an electric machine, configured to receive torque from the electric machine by a couple half of the clutch, and configured to produce a torque guiding connection between a combustion engine and the transmission. According to the procedure, when the clutch is in a slipping condition, a shifting demand to the transmission to shift from a neutral position to a gear is detected. After detecting such a shifting demand, either a counter is started so that when the counter reaches a first count, the torque transmission rate of the clutch is being increased, or an event detection is actuated to detect an event that directly precedes the shifting process, so that when this event is detected, the torque transmission rate of the clutch is increased.

20 Claims, 4 Drawing Sheets

(52) U.S. Cl.
CPC .............. *F16D 2500/30806* (2013.01); *F16D 2500/3166* (2013.01); *F16D 2500/7044* (2013.01); *F16D 2500/70282* (2013.01)

(56) References Cited

U.S. PATENT DOCUMENTS

2008/0312038 A1\* 12/2008 Nakagawa ............ F16D 48/062
　　　　　　　　　　　　　　　　　　　　　　477/175
2013/0297135 A1　　11/2013　Yamanaka et al.

FOREIGN PATENT DOCUMENTS

| DE | 10 2007 047 785 A1 | 5/2009 |
| DE | 10 2007 055 830 A1 | 6/2009 |
| DE | 10 2007 055 832 A1 | 6/2009 |

\* cited by examiner

METHOD TO CONTROL THE TORQUE TRANSFER RATE OF A CLUTCH, CLUTCH CONTROL UNIT FOR A CLUTCH AND TRANSMISSION WITH SUCH A CONTROL UNIT

The invention relates to a procedure for controlling the torque transmission rate of a clutch, in which the clutch is arranged in such a way, that it produces a torque guiding connection between a combustion engine and a transmission. The invention further relates to a clutch control unit, as well as a transmission with such a clutch control unit.

From the publication DE 10 2007 047 785 A1, a procedure for operating a parallel hybrid drive train of a vehicle with an internal combustion engine, an electrical machine, a transmission and an output is known. Between the internal combustion engine and the electrical machine, a first shift element is arranged, which is equipped with an infinitely variable transmission capability. The transmission capability of the first shift element is adjusted for transmission values according to the operating conditions, which result in an immediate closing or opening of the first shift element with the operating force that is corresponding to the set transmission capability. This means, that the first shift element is operated at its slip limit.

A further embodiment of the prior art is accomplished by means of the characteristics of patent claim 1, whereby further advantageous embodiments result from the subclaims, their description as well as from the figures.

By means of a clutch, a torque guiding connection between two shafts can be achieved, and can also be subsequently released. For this, the clutch consists of two coupling halves, which are connected to one of the shafts, respectively. By applying an operating force onto at least one of the two coupling halves, the torque guiding connection is established. The torque transmission rate of a clutch is a measurement of how much torque is transmitted from one coupling half to the other coupling half. If the entire torque is transmitted, then the torque transmission rate has the value of 1. The clutch is fully closed in this state. If no torque is transmitted, even though there is torque on one coupling half, then the torque transmission rate has the value of 0, the clutch is fully opened. Depending on the construction type of a clutch, it is possible that the torque transmission rate of a clutch reaches values between 0 and 1. Disk clutches and multiple disk clutches are especially well suited for this, where a basically infinitely variable adjustment of the torque transmission rate can be accomplished, depending on the contact force onto the friction surface of the disk or multi disk.

If only part of the torque is transmitted, then there is a differential speed and thus a relative motion between the friction surfaces of the two coupling halves. This operating state of the clutch is called slipping condition. Thereby, the torque transmission rate is ranging between the values of 0 and 1. The product of the differential speed and the amount of the torque, which is not transmitted from one coupling half to the other, is lost as power dissipation in form of heat on the friction surfaces. Thus, for reasons of efficiency, the torque transmission rate in the slipping state should be selected in such a way, that a high power dissipation and therefore a necessary cooling device can be avoided.

If the torque transmission rate has the value of 0, then an increase in the clutch actuating force will only lead to an increase of the torque transmission rate, as soon as the friction surfaces of the clutches contact one another and thus torque is being transmitted from one coupling half to the other coupling half. That operating state of the clutch, where a slight increase of the clutch actuating force leads to a transmission of torque, is called friction point. In particular multi disk clutches are preferably operated at the friction point in open condition, which means with a torque transmission rate of 0, since there might be a rattling noise in the fully opened condition, which could be perceived as distracting.

The torque transmission rate of the clutch is controlled by means of a clutch control unit. Depending on external parameters, such as torque and/or rotation speed of the two coupling halves, the clutch control unit controls the actuating force of the clutch, and thus sets a target-torque transmission rate for the clutch. This can also be achieved in form of a regulation.

A transmission is used for adjusting the rotation speed and torque between a transmission input and a transmission output by means of one or several selectable transmission ratios. The transmission can be constructed as a step-by-step variable speed transmission, which consists of several discrete transmission ratios, or also as a transmission with an infinitely variable transmission ratio. Discrete transmission ratios are also called gears. The representational invention preferably relates to an automatic transmission or to an automated transmission, in which a change of the transmission ratio is achieved by automated operating control elements. In particular transmissions for motor vehicles consist of a neutral position in addition to the individual gears. In the neutral position, there is no, or only an insignificant torque transmission between the transmission input and the transmission output.

If a shifting demand occurs in the transmission, then a different gear is selected with a shifting operation of at least one shift element in the transmission, or the at least one shift element causes the engaging of the neutral position. The shifting demand can be initiated by a selector lever or by a control unit. Generally, the shifting demand, to change gears from the neutral position to another gear, occurs by means of a manual operation of the selector lever.

An electrical machine consists of a stator and a rotor, and is designed in such a way that it changes electrical energy into mechanical energy in form of rotation and torque. According to the invention, an electrical machine is designed in such a way, that it releases torque onto the particular coupling half of the clutch, which is connected to the transmission. In order to accomplish this, the electrical machine can be integrated into the transmission, or also be arranged as an individual unit between the clutch and the transmission. The rotor of the electrical machine can be connected to a first transmission shaft of the transmission in a rotationally fixed manner, or via one or more gear ratios.

The procedure according to the invention for controlling the torque transmission rate of the clutch, accomplishes that a change of the rotation speed and/or torque of the electrical machine, which is caused by means of engaging a gear in the transmission from the neutral position, does not have any or only very little impact on the set slipping condition or on the set friction point of the clutch. This effect is achieved by means of a foresighted increase of the torque transmission rate of the clutch. Herein, the change of the torque transmission rate is not accomplished by means of a detection of a change of the rotor speed of the electrical machine. Rather, the increase of the torque transmission rate is performed with the foresight, and due to the knowledge, that there will be an change of the rotor speed in the moment of the increase, even though it has not yet occurred.

When the clutch is in the friction point, for example at a standstill of the combustion engine and the rotor speed of the electrical machine for supplying the transmission with lubricating oil pressure, and when a gear is engaged in the transmission from the neutral position of this operating position, than the rotor of the electrical machine is suddenly subjected to additional torque, which results in a reduced rotor speed as long as the power supply of the electrical machine initially remains constant. Since the rotation speed of one coupling half is directly dependant on the rotor speed, the rotation speed of this coupling half is reduced as well. This rotation reduction has an influence on the friction point of the clutch. Until a friction point regulation of the clutch control unit has readjusted the friction point of the clutch, the rotor speed has already returned to its original value by means of increasing the torque of the rotor, by means of which the friction point is influenced again. The corresponding increase of the rotation speed can have the effect, that the torque transmission rate reaches a value larger than 0, which leads to a torque transmission from the rotor to the standing combustion engine. This process is perceived as a humming noise, which is not desired.

When the combustion engine is operated in its idle speed and in comparison to the idle speed, in a slow rotor speed for supplying the transmission with lubricating oil pressure and/or for charging an external electrical energy storage, an operation of the clutch in slipping condition for a vibration dampening can be advantageous. If a gear is engaged from the neutral position in this operating position of the transmission, then the rotor of the electrical machine is a suddenly subjected to additional torque, which results in a reduced rotor speed as long as the power supply of the electrical machine initially remains constant. Since the rotation speed of one coupling half is directly dependant on the rotor speed, the rotation speed of this coupling half is reduced as well. This rotation reduction has an influence on the slipping condition of the clutch, which can result in an opening of the clutch, which means a torque transmission rate with the value of 0. By means of this, the rotation speed of the combustion engine increases, since there is a sudden loss of load. Until the rotation speed control of the combustion engine and the slipping condition control of the clutch have reacted to the changed circumstances, the rotor speed has already returned to its original value due to an increase of the torque of the rotor, which in turn influences the slipping condition again. This can lead to a total engaging of the clutch, which means a torque transmission rate with the value of 1. Such a sudden increase in load of the combustion engine can also lead to a humming noise, which is also not desired.

By means of an increase of the torque transmission rate of the clutch according to the invention, a reduction of the rotor speed is accomplished after detecting a shifting demand from the neutral position of the transmission towards another gear, which has no or only very little effect on the set friction point or on the set slipping condition of the clutch. The torque transmission rate is increased ahead of time, with the foresight, that the rotor speed will reduce. By means of this, a dynamic interpretation of the control parameter for the electrical machine for the clutch control unit as well as for the combustion engine is not necessary. This is advantageous, since highly dynamic controls are susceptible for interfering signals, and since these could lead to an uncontrolled oscillation of the regulatory system.

Since there is a dead time between the shifting demand and the start of the shifting process, it is also important that a dead time is added when the corresponding shifting demand is detected, until the torque transmission rate has been increased accordingly. The dead time can be derived from the processing time of a transmission electronics unit, which triggers the shifting process after detecting a shifting demand, from the inertia of the shift element, which causes the shifting process, as well as from the inertia of the clutch actuation, which causes the increase of the torque transmission rate.

When a shifting demand is detected, a counter is started. The counter increases its value incrementally with the passing of time. When the counter reaches a first count, the torque transmission rate is being increased. The first count is selected in such a way that it takes the dead time between the shifting demand and start of the shifting process into account, as well as the inertia of the change of the torque transmission rate.

As an alternative to the counter, an event detection is intended, which detects an event that directly precedes a certain shifting process. The event detection is activated, when a shifting demand issuing from the neutral position occurs. If the shift element, which causes the shifting process, is hydraulically activated, then e.g. the filling of an oil chamber of the hydraulically activated shift element can be detected. The corresponding event that is sensed here, is the oil pressure in the oil chamber, or the power consumption of the corresponding hydraulic valve. If the shift element, which causes the shifting process, is activated electromechanically, the power consumption of the respective electric motor can serve as the event. Since the filling of the oil chamber or the power consumption of the electric motor directly causes the shifting process in a mechanical way, these events directly precede the shifting process. These events are thus particularly well suited as triggers for increasing the torque transmission rate of the clutch.

The two trigger conditions for increasing the torque transmission rate can also be connected to each other. Thereby, the torque transmission rate is being increased as soon as, either the counter reaches the first count, or the event detection senses a respective event, which directly precedes the shifting process, depending on which of these conditions is met earlier. By means of this, a delayed or not-occurring increase of the torque transmission rate, due to a late or missed detection of the event is being prevented, without forgoing the advantages of a correct event detection.

According to one embodiment, the amount, by means of which the torque transmission rate of the clutch is being increased, is dependent on the external load of the transmission. The external load of the transmission is present in the form of torque at the transmission output. The higher the external load, the more the rotor speed is reduced, as long as the power supply of the electrical machine initially remains constant. Thus, the value, by which the torque transmission rate of the clutch is increased, rises with the amount of the external load. If a separator is arranged in the power flow towards the transmission output, by means of which an external load can be disconnected from the transmission, then the external load will have no effect the rotor, and therefore, does not need to be considered. The separator can be designed in the form of a clutch. If such a clutch is equipped with an infinitely variable torque transmission rate, then the separator is also called a start-up element. If a start-up element is intended, then the amount by which the torque transmission rate of the clutch has to be increased, depends on the external load and the torque transmission rate of the start-up element.

Preferably, the increase of the torque transmission rate does not occur abruptly, but rather continuous along a ramp function. By means of this, a retroactive effect on the rotation speed control of the electric machine, or also of the rotation speed control of the combustion engine, due to a sudden change of the torque transmission rate, is reduced. The time course of the increase, in particular the gradient of the ramp function, depends on which gear is shifted to, from neutral position. The mass inertia, which has to be accelerated when a gear is engaged, depends on the selected gear. An adaptation of the time course of the increase of the torque transmission rate takes this circumstance into account, and thus improves the effectiveness of the foresighted increase of the torque transmission rate. The reduction of the torque transmission rate over time, after its increase does also not occur abruptly, but continuous along a ramp function as well. The ramp function for the reduction of the torque transmission rate can be configured differently than the one for its increase. The time course of the reduction of the torque transmission rate, also depends on which gear is shifted to, from neutral position.

According to one embodiment of the invention, the time course of the increase, in particular the gradient of the respective ramp function, depends on the temperature of the transmission or the temperature of the transmission oil. Depending on the temperature, the behavior of the clutch in slipping condition or also in the friction point, changes. The lower the temperature, the slower the torque transmission rate will be increased. The time course of the reduction of the torque transmission rate after its increase, also depends on the temperature of the transmission or the temperature of the transmission oil. The lower the temperature, the slower the torque transmission rate will be reduced. The amount, by which the torque transmission rate of the clutch is increased and subsequently reduced, also depends on the temperature of the transmission or the temperature of the transmission oil. The lower the temperature, the higher the amount by which the torque transmission rate of the clutch will be increased and subsequently reduced.

The dependencies, to which amount and in which way the torque transmission rate of the clutch is to be increased, can be contained in either a linear-, or in form of a pre-defined non-linear course.

If the torque transmission rate was increased due to a respective shifting demand, then a stable operating condition is achieved. Yet, the increased torque transmission rate leads to an undesired increase of the power dissipation in form of friction in the clutch. Therefore it is advantageous to reduce the torque transmission rate again after the increase.

According to an embodiment of the invention, the trigger for the reduction of the torque transmission rate after its increase, is the reaching of a second count of the counter. If the counter has already been the trigger for the increase of the torque transmission rate, then the value of the counter further increases until it reaches the second count. Alternatively, the counter can also be started as soon as the torque transmission rate of the clutch is reached, or as soon as the increase has been accomplished. The second count is hereby set in such a way, that it is reached when the shifting process has already been accomplished and the rotor speed is rising again. By means of this, the reduction of the torque transmission rate is reached in time, independent of a possibly faulty parameter evaluation.

According to a further embodiment of the invention, the reduction of the torque transmission rate after its increase, is triggered, when the sum of the difference between the rotation speed of the coupling half, which is connected to the transmission before the increase and after the increase of the torque transmission rate, falls under a limit value. For this, the current speed of the rotor of the electrical machine is recorded, its value before the increase is saved, and its value after the increase of the torque transmission rate is regularly compared with the saved value. If the machine is a synchronous machine, then it consists of a high-resolution rotary encoder of the rotor. Since the rotation speed of the coupling half that is connected to the transmission, is dependent on the rotor speed, the signal of the rotary encoder of the rotor is sent to the clutch control unit, and can thus be used for controlling the torque transmission rate. Alternatively, a signal of a rotational speed sensor can be used as well. This one could also be part of the transmission. The limit value is selected in such a way, that it can be concluded by means of it, that the shifting process has been completed, by means of which the rotor speed can converge to the original rotation speed again. This helps to achieve, that the torque transmission rate is reduced as soon as the shifting process is accomplished, and thus unnecessarily high power dissipation of the clutch is prevented.

Preferably, the trigger used for the reduction of the torque transmission rate after its increase is either the reaching of the second count, or the falling under the limit value of the sum of the difference between the rotation speed of the coupling half, which is connected to the transmission before the increase and after the increase of the torque transmission rate, depending on which criteria is met first. The achievement by means of this is, that the torque transmission rate can be reduced in time, even if the signal of the rotary encoder of the rotor or of the rotational speed sensor may not be available.

The clutch control unit for controlling the torque transmission rate of the clutch preferably consists of at least one interface, by means of which signals of a further control unit can be send to the clutch control unit. The signals, for example from a control unit of the combustion engine and/or signals from a control unit of a converter, which controls the output of the electrical machine, can be sent to the clutch control unit. Also signals of the transmission control unit can be sent to the clutch control unit. The signals are either directly led from the respective control unit to the at least one interface, or the at least one interface is connected to an information bus, on which the respective signals are available. The signals include the torque of the combustion engine, and/or the torque that is impressed onto the rotor of the electrical machine, as well as the rotor speed. For determining the plausibility, the rotation speed of the combustion engine can also be sent to the clutch control unit. The torque of the combustion engine is generally not recorded by measurements, but is rather the target torque value provided by the control unit of the combustion engine. The signal of a shifting demand can also be sent to the clutch control unit, for example via a suitable interface to the transmission control unit or directly by a selector lever. Information, which can be used for event detection of the shift process, can also be sent from the transmission control unit to the clutch control unit. The clutch control unit can also be part of the transmission control unit. The clutch control unit consists of means for controlling the torque transmission rate of the clutch, for example in form of a microprocessor. The microprocessor is designed in order to process the signals and to create an appropriate signal for the clutch actuation, which will issue the actuating force onto at least one of the two coupling halves of the clutch.

Embodiments of the invention are described in detail in the following, by means of the attached figures.

Figure 1:
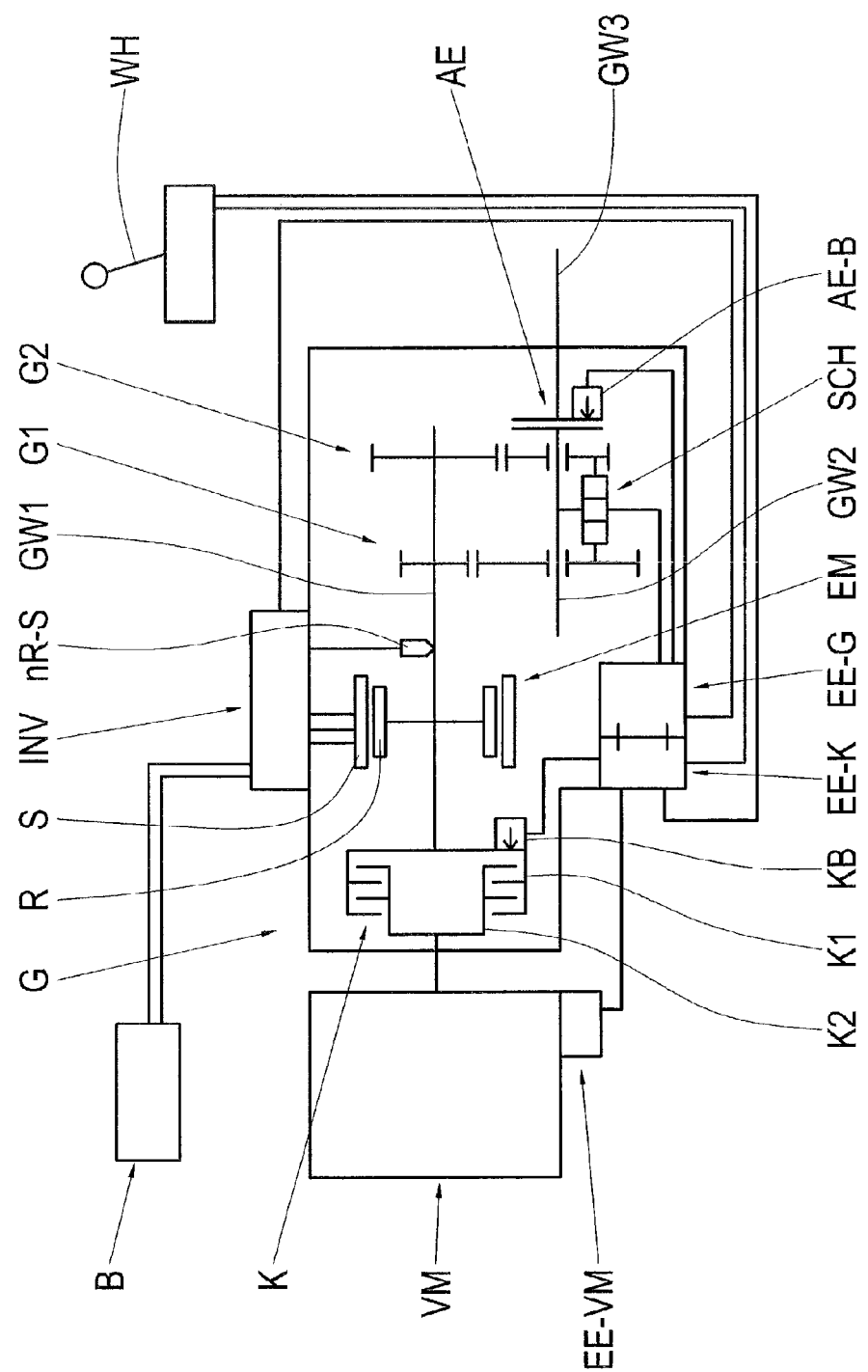
FIG. 1 depicts a schematic view of a transmission.

FIG. 1 depicts a schematic view of a transmission G. Transmission G consists of a clutch K in form of a multi disk clutch, an electrical machine EM with a rotor R and a stator S, a first transmission shaft GW1, a second transmission shaft GW2, a third transmission shaft GW3, two gears G1, G2 with different transmission ratios, a shift element SCH, a start-up element AE, a clutch control unit EE-K and a transmission control unit EE-G. The clutch K is arranged in such a way, that it produces a torque guiding connection between a crankshaft of a combustion engine VM and a first transmission shaft GW1 of the transmission G. Due to the construction type of the clutch K as a multi disk clutch, the torque transmission rate MR of the clutch K can be adjusted by means of an appropriate controlling of a clutch actuation KB. The clutch actuation KB is controlled by means of the clutch control unit EE-K. The rotor R of the electric machine EM is connected to a first transmission shaft GW1 in a rotationally fixed manner. The electric machine EM is supplied with power from a battery B, wherein a converter INV converts the DC voltage of battery B into a suitable AC voltage for the electrical machine EM, and sends it to the stator S. By means of the rotary encoder of the rotor nR-S, the rotation angle, and thus also the rotor speed, is recorded. The signal of the rotary encoder of the rotor nR-S is sent to the converter INV. Two gear wheels are exemplarily connected to the first transmission shaft GW1 in a rotationally fixed manner, which fit into the corresponding gear wheels that are rotationally mounted on the second transmission shaft GW2, and thus form a first gear G1 and a second gear G2. The shift element SCH is arranged in such a way that it produces a torque guiding connection between the second transmission shaft GW2 and one of the gear wheels that is mounted on the second transmission shaft GW2. The shift element SCH is further arranged in a such way, that it has a position, in which there is no torque guiding connection between the second transmission shaft GW2 and one of these gear wheels. If the shift element SCH is located in this position, then the transmission G is set in the neutral position N. Usually, the transmission G consists of a plurality of suchlike gears, and a corresponding plurality of shift elements SCH, but for reasons of clarity, only one individual shift element SCH is depicted. The shift element SCH is operated by means of the transmission control unit EE-G. The transmission control unit EE-G is arranged in such a way, that it evaluates signals of a selector lever WH, and to operate the shift element SCH according to this signal. The start-up element AE is arranged in such a way, that it creates a torque guiding connection between the second transmission shaft GW2 and a third transmission shaft GW3, whereby the torque transmission rate is basically infinitely variable by means of applying a force onto the actuation of the start-up element AE-B. The start-up element actuation AE-B is controlled by means of the clutch control unit EE-G. The start-up element AE ensures, that it is still possible to engage a gear G1, G2, when the third transmission shaft GW3 is subject to a high torque. If a gear G1, G2 is engaged, then the torque transmission rate of the start-up element can be increased slowly, without there being an abrupt drop of the rotor speed, or of the rotation speed of the crankshaft of the combustion engine VM. The clutch control unit EE-K is connected to the transmission control unit EE-G in such a way, that an information exchange between the two control units EE-K, EE-G is possible. In an embodiment of the invention, the clutch control unit EE-K can also be part of the transmission control unit EE-G. The clutch control unit EE-K is connected to the control unit EE-VM of the combustion engine VM, to the selector lever WH as well as to the converter INV in such a way, that an information flow towards the clutch control unit EE-VK is possible. The transmission input is here made up of the first transmission shaft GW1, and the transmission output is made up of the third transmission shaft GW3. The transmission input may be subject to torque of the combustion engine VM and/or of the electrical machine EM. By means of the transmission ratios of the gears G1, G2 between the first transmission shaft GW1 and the second transmission shaft GW2, it is possible to transform the torque at the transmission input. The torque that is transformed in this way by means of the start-up element AE, and which the second transmission shaft GW2 is subjected to, is transmitted to the third transmission shaft GW3, and is therefore also to the transmission output.

Figure 2:
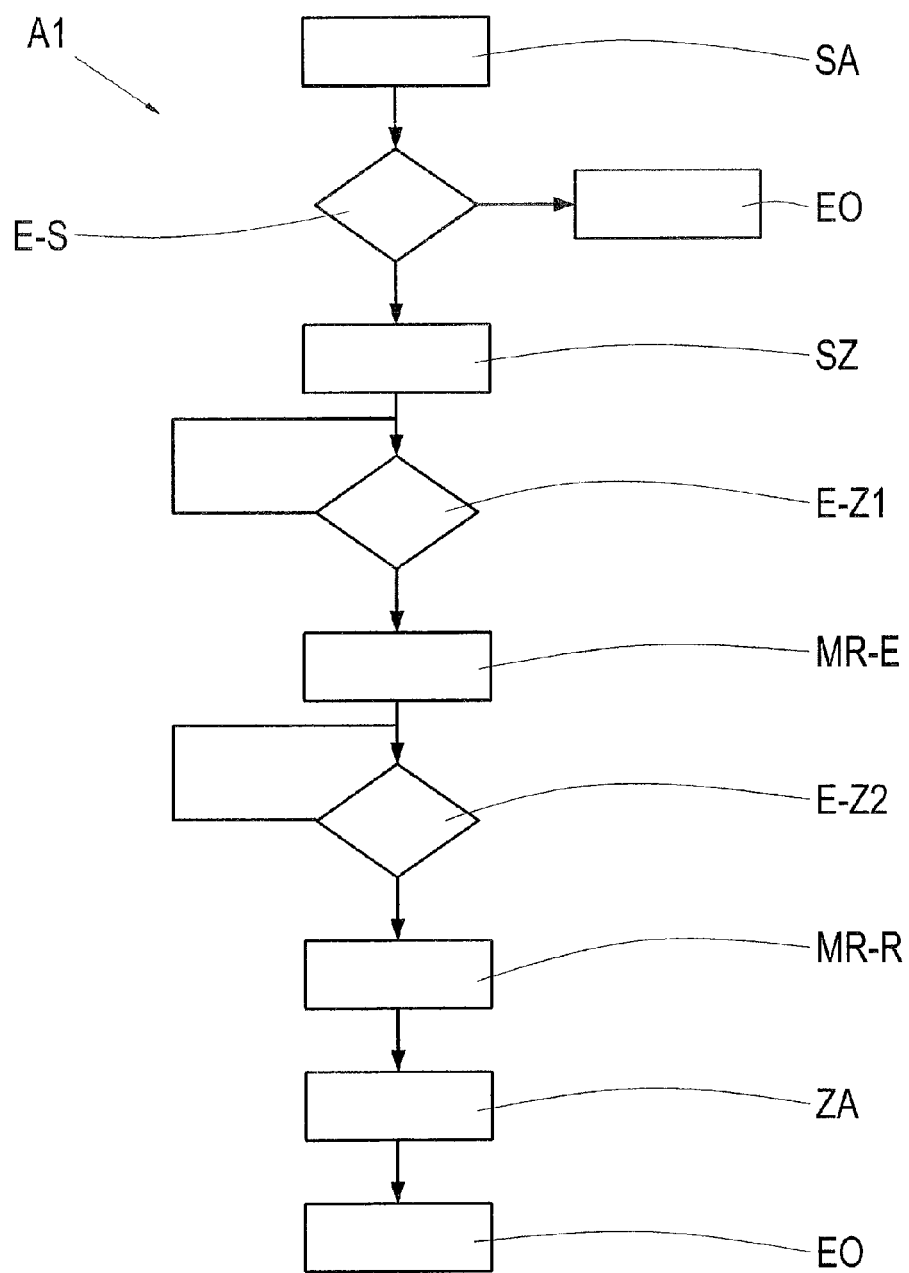
FIG. 2 depicts the course of an increase and a subsequent reduction of the torque transmission rate of a clutch according to a first embodiment.

FIG. 2 depicts the course of an increase and a subsequent reduction of the torque transmission rate MR of the clutch K according to a first embodiment. A shifting demand SA to the great box G, to shift from the neutral position N of the transmission G to another gear G1, G2, is detected and sent to the clutch control unit EE-K as an event. This shifting demand SA triggers a first cycle A1 within the clutch control unit EE-K. By means of the slipping-decision E-S, a primary check is performed, to find out if the clutch K is in slipping condition or in the friction point. If the clutch K is not in the slipping condition or in the friction point, then cycle A1 is ended by means of an abort function EO. If the clutch K is in the slipping position or in the friction point, then a counter Z is started by means of the count SZ. The count SZ causes the counter Z to increase its value incrementally over the course of time. By means of a first counter reading check E-Z1 it is examined, if the value of counter Z has reached a first count Z1. If the value of counter Z has reached the first count Z1, then the clutch control unit EE-K sends out a torque transmission rate increase signal MR-E, which causes an increase of the torque transmission rate MR of the clutch K. In the meantime, the value of counter Z increases further. By means of a second counter reading check E-Z2, it is examined if the value of the counter Z has reached a second count Z2. If the second count Z2 is reached, the clutch control unit EE-K sends out a torque transmission rate reduction signal MR-R, which causes a reduction of the torque transmission rate MR of the clutch K. By means of a counter stop ZA, the counter is stopped and its value is reset to the value of 0. Subsequently, the first cycle A1 is ended by means of the abort function EO.

Figure 3:
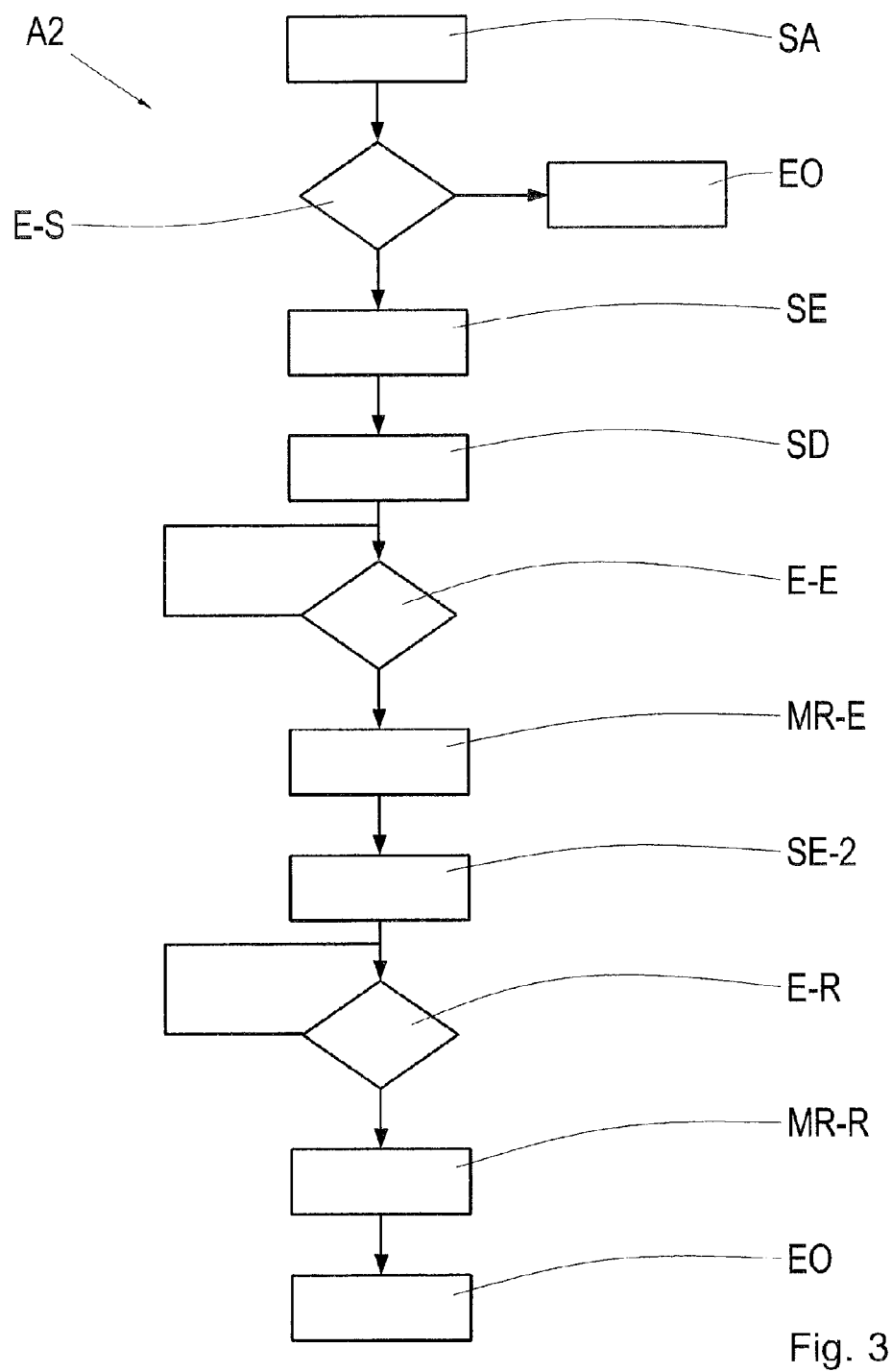
FIG. 3 depicts the course of an increase and a subsequent reduction of the torque transmission rate of a clutch according to a second embodiment.

FIG. 3 depicts the course of an increase and a subsequent reduction of the torque transmission rate MR of the clutch K according to a second embodiment. A shifting demand SA to the great box, to shift from the neutral position N of the transmission G to another gear G1, G2, is detected and sent to the clutch control unit EE-K as an event. This shifting demand SA triggers a second cycle A2 within the clutch control unit EE-K. By means of the slipping-decision E-S, a primary check is performed, to find out if the clutch K is in slipping condition or in the friction point. If the clutch K is not in the slipping condition or in the friction point, then the second cycle A2 is ended by means of an abort function EO. If the clutch K is in the slipping position or in the friction point, then an event detection E is started by the event detection start function SE, as well the current rotor speed nR of the rotor R of the electrical machine EM is saved by means of the rotation speed record function SD. By means of saving the rotor speed nR with the help of the rotation speed record function SD, a formerly saved value of the rotor speed nR is overwritten. By means of the increase event detection E-E, an event is detected, that directly precedes a shift process SV from the neutral position of the transmission G to another gear G1, G2. If the increase event detection E-E detects such an event, then the clutch control unit EE-K sends out a torque transmission rate increase signal MR-E, which causes an increase of the torque transmission rate MR of the clutch K. Subsequently, the event detection E is ended by an event detection stop function SE2. By means of a rotor speed difference function E-R, the previously saved rotor speed value R is compared with the current value of the rotor speed nR with the help of the rotation speed record function SD. If the value of the sum of this comparison falls under a limit value nR-L, then the clutch control unit EE-K sends out a torque transmission rate reduction signal MR-R, which causes a reduction of the torque transmission rate MR of the clutch K. Subsequently, the second cycle A2 is ended by means of the abort function EO.

Figure 4:
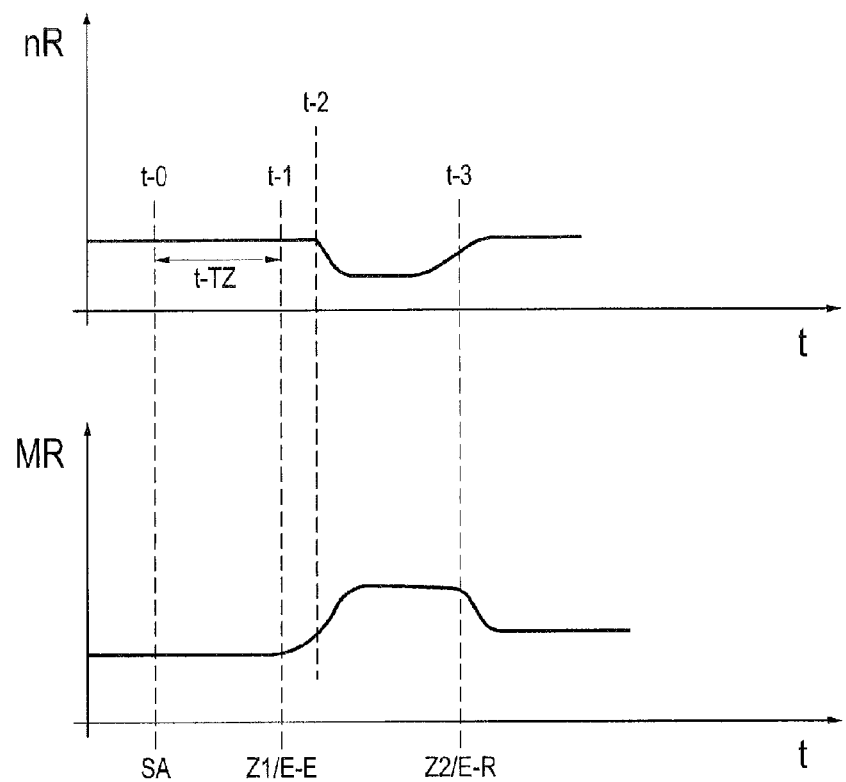
FIG. 4 depicts the exemplified time course of the rotor speed and the torque transmission rate of the clutch.

FIG. 4 depicts a exemplary course of the torque transmission rate MR of the clutch K and of the rotor speed nR over the course of time t. At the start, the rotor speed nR features a value larger than 0. Since the torque transmission rate MR of the clutch K has a value larger than 0, it is in slipping condition. At the moment to, a shifting demand SA occurs to the transmission G, to shift from the neutral position N of the transmission G to another gear G1, G2. Since the shifting demand SA in itself does not cause any change in the transmission G, there is no change of the rotor speed nR during the course of a dead time t-TZ. If the counter Z reaches a first count Z1 at the moment t-1, or if the increase event detection E-E detects a respective event which directly precedes a shifting process SV, then the torque transmission rate MR of the clutch K is increased. The start of this increase is earlier than the reduction of the rotor speed nR, which is caused by the shifting process SV. Instead of reacting to a reduction of the rotation speed nR, the torque transmission rate MR of the clutch K is increased ahead of time. Then, at the moment t-2, the rotor speed nR is reduced. At this moment t-2, the torque transmission rate MR of the clutch K is already being reduced, even though the torque transmission rate MR has not reached the value, to which is should be increased at the moment t-2. At the moment t-2, the torque transmission rate MR has only been increased a little. At the moment t-3, the sum of the difference between the rotor speed nR before the increase of the torque transmission rate MR of the clutch K and the current rotor speed nR falls under the limit value nR-L. This event is detected by means of the rotor speed difference function E-R, and thus leads to a reduction of the torque transmission rate MR. In the depicted exemplary embodiment, counter Z reaches the second count Z2 at the moment t-3, which also results in the reduction of the torque transmission rate MR of the clutch K.

Depending on the operating condition of the transmission G, the start of the increase of the torque transmission rate MR of the clutch K can also occur at the same time as the reduction of the rotor speed nR.

If the clutch K is not in slipping condition, but rather in the friction point, then this condition is being detected as well, and will likewise lead to an increase and subsequent reduction of the torque transmission rate MR according to the previously described course.

If the transmission G is in the neutral position N, which means that the shifting element SCH is operated in such a way that it does not produce any torque guiding connection between the second transmission shaft GW2 and one of the gear wheels that is mounted on the second transmission shaft GW2, and if there is a shifting demand by the selector lever WH, to engage a gear G1, G2, then the clutch control unit EE-K checks, if the clutch K is in slipping condition or in the friction point, and the transmission control unit EE-K sends out a signal, that causes a first gear G1 or a second gear G2 to be engaged by the shifting element SCH. If the clutch K is in slipping condition or in the friction point, then the torque transmission rate MR of the clutch K is increased with a delay, so that the increase starts a short moment before, or at the same time as the engaging of the first gear G1 or the second gear G2 by means of the shifting element SCH. If the torque transmission rate MR of the start-up element AE is set in such a way, that there is no torque transmission between the second shaft GW2 and the third shaft GW3, then the second transmission shaft GW2 is accelerated when a gear G1, G2 is engaged. By means of the mass inertia of the second transmission shaft GW2, rotor R is thus subject to an additional torque, by means of which the rotor speed nR is reduced. Since the torque transmission rate MR of the clutch K has been increased in a foresighted way, this reduction of the rotor speed nR does not cause any closing/opening of the clutch K. If the torque transmission rate MR of the start-up element AE is set in such a way that the third transmission shaft GW3 is subject to an external load, then the sum, by which the torque transmission rate MR of the clutch K has to be increased, is adapted accordingly.

REFERENCE SIGNS

SA Shifting demand
SV Shifting process
MR torque transmission rate
G Transmission
GW1 First transmission shaft
GW2 Second transmission shaft
GW2 Third transmission shaft
G1 First Gear
G2 Second Gear
SCH Shift element
VM Combustion engine
EM Electric motor
R Rotor
S Stator
nR Rotor speed
nR-L Limit value
nR-S Rotary encoder
INV Converter
B Battery
WH Selector lever
K Clutch
K1 First coupling half
K2 Second Coupling half
KB Clutch actuation
AE Start-up element
AE-B Start-up element actuation
EE-K Clutch control unit
EE-VM Control unit of the combustion motor
EE-G Transmission control unit
N Neutral position Z Counter
Z1 First count
Z2 Second count
E Event detection
t Time
t-0 Moment
t-1 Moment
t-2 Moment
t-3 Moment
t-TZ Dead time
A1 First cycle
A2 Second cycle
E-S Slipping decision
E-Z1 First counter reading check
E-Z2 Second counter reading check
E-E Increase event detection
E-R Rotor speed difference function
SZ Counter start
ZA Counter stop
SE Event detection start function
SE2 Event detection stop function
SD rotation speed record function
MR-E torque transmission rate increase signal
MR-R torque transmission rate reduction signal
EO abort function

The invention claimed is:

1. A procedure for controlling a torque transmission rate of a clutch by a clutch control unit, wherein the clutch is in connection with a transmission and an electric machine and wherein a coupling half of the clutch is configured to receive torque from the electric machine to transfer torque between a combustion engine and the transmission, the procedure comprising:
   determining whether the clutch is in a slipping condition or a friction point; and
   when the clutch is in the slipping condition or the friction point, increasing, by the clutch control unit, the torque transmission rate of the clutch after detecting a shift demand for a shifting process to shift from a neutral position of the transmission to a target gear of a plurality of transmission gears,
   wherein increasing the torque transmission rate after detecting the shifting demand results in a reduction of a retroactive effect on the slipping condition or the friction point during the shifting process.

2. The procedure according to claim 1 further comprising:
   starting a counter after detecting the shift demand,
   wherein the step of increasing the torque transmission rate of the clutch occurs when the counter reaches a first count.

3. The procedure according to claim 1, further comprising detecting an event with an event detection, wherein the event occurs in the transmission prior to the shifting process, and wherein the step of increasing the torque transmission rate of the clutch occurs when the event is detected.

4. The procedure according to claim 1, further comprising:
   starting a counter after the shift demand is detected; and
   activating an event detection after the shift demand is detected, wherein the event detection is configured to detect an event that directly and imminently leads to the shifting process,
   wherein the step of increasing the torque transmission rate of the clutch occurs when the counter reaches a first count or when the event is detected, whichever occurs earlier.

5. The procedure according to claim 1, wherein a magnitude of the torque transmission increase of the clutch during the step of increasing the torque transmission rate is dependent on an external load applied to the transmission.

6. The procedure according to claim 1, wherein increasing the torque transmission rate comprises increasing the torque transmission rate over a time period, wherein the time period is determined based on which gear of the plurality of gears the shifting process is shifting to from the neutral position.

7. The procedure according to claim 1, wherein increasing the torque transmission rate comprises increasing the torque transmission rate over a time period that depends on a temperature of the transmission or a temperature of transmission oil in the transmission.

8. The procedure according to claim 1, further comprising:
   reducing the torque transmission rate after increasing the torque transmission rate.

9. The procedure according to claim 8, further comprising starting a counter after the shift demand is detected, wherein the torque transmission rate is reduced when the counter reaches a second count.

10. The procedure according to claim 8, further comprising:
    recording a rotor speed of the electric machine before increasing the torque transmission rate, and
    wherein reducing the torque transmission rate occurs when a difference between a target rotor speed and the recorded rotor speed falls under a limit value.

11. The procedure according to claim 8, further comprising:
    starting a counter, and
    recording a rotor speed of the electric machine before increasing the torque transmission rate,
    wherein reducing the torque transmission rate occurs when the counter reaches a second count or when a difference between a target rotor speed and the recorded rotor speed falls under a limit value, whichever occurs earlier.

12. The procedure according to claim 8, wherein reducing the torque transmission rate comprises reducing the torque transmission rate over a time period, wherein the time period depends on which gear of the plurality of gears the shifting process is shifting to from the neutral position.

13. The procedure according to claim 8, wherein reducing the torque transmission rate comprises reducing the torque transmission rate over a time period that depends on a temperature of the transmission or a temperature of transmission oil of the transmission.

14. The procedure according to claim 1, wherein the retroactive effect comprises a change of the slipping or friction point caused by a rotor speed change of the electric machine due to the shifting process.

15. A device, comprising
    a clutch control unit for controlling a torque transmission rate of a clutch, comprising:
    at least one interface configured to communicate with further control units,
    wherein the clutch is in connection with a transmission and an electric machine to receive torque from the electric machine and to transfer torque between a combustion engine and the transmission, wherein the clutch control unit is configured to:
    determine whether the clutch is in a slipping condition or a friction point; and
    when the clutch is in the slipping condition or the friction point, increase the torque transmission rate of the clutch after detecting a shift demand for a shifting process to shift from a neutral position of the transmission to a target gear of a plurality of gears of the transmission, wherein increasing the torque transmission rate after detecting the shift demand results in a reduction of a retroactive effect on the slipping condition or the friction point of the clutch during the shifting process.

16. The device according to claim 15, further comprising the transmission, the transmission comprising:

the clutch,
the electric machine,
a first transmission shaft,
a second transmission shaft, and
at least one shift element,
wherein the clutch transfers torque between the combustion engine and the first transmission shaft,
wherein the electric machine is connected with the clutch in such a way that the torque is transmitted to the first transmission shaft, and
wherein the at least one shift element is arranged to engage one of a plurality of gears or the neutral position within the transmission.

17. The device according to claim 16, wherein the transmission further comprises a third transmission shaft and a start-up element configured to adjust the torque transmission rate between the second transmission shaft and the third transmission shaft.

18. The device according to claim 16,
wherein the clutch control unit is further configured to, after detecting the shifting demand,
start a counter, and
activate an event detection to detect an event of the at least one shift element that directly and imminently lead to the shifting process, and
wherein increasing the torque transmission rate of the clutch occurs when the counter reaches a first count or when the event is detected, whichever occurs earlier.

19. The device according to claim 15, wherein the clutch control unit is further configured to reduce the torque transmission rate after the increase of the torque transmission rate.

20. The device according to claim 15, wherein the retroactive effect comprises a change of the slipping or friction point caused by a rotor speed change of the electric machine due to the shifting process.

* * * * *